United States Patent
Saito (10) Patent No.: US 7,006,488 B1
(45) Date of Patent: Feb. 28, 2006

(54) APPARATUS AND METHOD FOR DESIGNING COMMUNICATION PATHS OF TREE STRUCTURE

(75) Inventor: Hiroyuki Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 457 days.

(21) Appl. No.: 09/616,672

(22) Filed: Jul. 14, 2000

(30) Foreign Application Priority Data

Jul. 15, 1999 (JP) ................................. 11-201929

(51) Int. Cl.
*H04L 12/66* (2006.01)
(52) U.S. Cl. .................................................... 370/352
(58) Field of Classification Search ................ 370/230, 370/231, 235, 238, 238.1, 254, 256, 351, 370/392, 395.1, 395.5, 395.51, 395.52, 396; 709/238, 241, 223
See application file for complete search history.

(56) References Cited

U.S. PATENT DOCUMENTS

| | | | | |
|---|---|---|---|---|
| 6,363,319 B1 * | 3/2002 | Hsu | ............................. | 701/202 |
| 6,522,627 B1 * | 2/2003 | Mauger | ....................... | 370/230 |
| 6,538,991 B1 * | 3/2003 | Kodialam et al. | .......... | 370/229 |
| 6,556,544 B1 * | 4/2003 | Lee | ............................. | 370/256 |
| 6,584,071 B1 * | 6/2003 | Kodialam et al. | .......... | 370/238 |

OTHER PUBLICATIONS

Saito et al, Traffic Engineering using Multiple Multipoint-to-Point LSPs, IEEE, pp. 894-901, Mar. 26-30, 2000.*
Semeria, Traffic Engineering for the New Public Network, Juniper Networks, pp. 1-24, Jan. 25, 1999.*
Villamizar, MPLS Optimized Multipath (MPLS-OMP), Internet Draft, pp. 1-21, Feb. 25, 1999.*

* cited by examiner

*Primary Examiner*—Frank Duong
(74) *Attorney, Agent, or Firm*—McGinn IP Law Group, PLLC

(57) ABSTRACT

According to a first aspect of the present invention, an objective function is defined for minimizing a number of candidate tree graphs for accommodating the communication paths and a first constraint equation is defined for causing all of the candidate tree graphs to form a tree. A second constraint equation is defined for accommodating the communication paths in one of the candidate tree graphs. A third constraint equation is defined for determining whether each of the candidate tree graphs is used to accommodate the communication paths. A mathematical programming problem formed by the objective function, and the first, second and third constraint equations is solved to obtain a plurality of trees in which the communication paths can be accommodated.

12 Claims, 10 Drawing Sheets

APPARATUS AND METHOD FOR DESIGNING COMMUNICATION PATHS OF TREE STRUCTURE

BACKGROUND OF THE INVENTION

1. Field of the Invention

The present invention relates generally to communication networks and more particularly to the design of communication paths of tree structure within a communication network between an ingress node and an egress node the network.

2. Description of the Related Art

In a label-switched communication system, such as ATM (asynchronous transfer mode) and MPLS (multiprotocol label switching) systems, an active communication path is provisioned between an ingress node and an egress node for carrying normal traffic and, in most cases, one or more spare paths are provisioned for purposes of protection switching or distributing overflow traffic. However, a large number of virtual channel identifiers (VCIs) and virtual path identifiers (VPIs) must be registered if all possible routes are provisioned between all pairs of ingress and egress nodes. In order to overcome this problem, a technique known "VP/VC merge" has been proposed, whereby multiple communication paths are provisioned using a single VPI or VCI.

In a communication system where a single VPI/VCI is used for identifying multiple paths provisioned between an ingress and an egress node, the structure of the paths is treated as a tree and the egress node assumes the root of the tree so that traffic is carried in the opposite sense. It is thus desirable that the number of such trees be as small as possible to reduce the number of labels (i.e., VPIs and VCIs) to a minimum.

One approach to designing a tree is to use the Dijkstra method ("Saitekika Handbook, Iri et al, Asakura Shoten publishing company), whereby all possible routes from one egress node to each ingress node are searched for in an attempt to determine shortest paths from which a tree is formed. A tree is formed by a technique known as the minimum spanning tree method ("Enshuu Graph Riron", Iri et al, Korona-sha publishing company), in which the tree is defined as one in which the total sum of branch metrics is at a minimum. Such a tree can be obtained by a technique known as the Kruskal method.

While the known techniques allow provisioning of a single tree between an ingress node and an egress node, it is impossible to design a plurality of trees between these nodes.

SUMMARY OF THE INVENTION

It is therefore an object of the present invention to provide an apparatus and method for designing a plurality of trees within a communication network. The communication path of each tree is independent from every other paths of the tree. Thus, in each tree, nodes and links are not shared by different communication paths.

Another object of the present invention is to provide an apparatus and method for designing a plurality of communication paths within a communication network with a minimum number of trees.

According to a first aspect of the present invention, an objective function is defined for minimizing a number of candidate tree graphs for accommodating the communication paths and a first constraint equation is defined for causing all of the candidate tree graphs to form a tree. A second constraint equation is defined for accommodating the communication paths in one of the candidate tree graphs. A third constraint equation is defined for determining whether each of the candidate tree graphs is used to accommodate the communication paths. A mathematical programming problem formed by the objective function, and the first, second and third constraint equations is solved to obtain a plurality of trees in which the communication paths can be accommodated.

According to a second aspect of the present invention, an existing tree is stored and a decision is made as to whether communication paths can be accommodated in the existing tree. An objective function is defined for minimizing a number of candidate tree graphs for accommodating those communication paths which cannot be accommodated in the existing tree. A first constraint equation is defined for causing all of the candidate tree graphs to form a tree if all of the communication paths cannot be accommodated in the existing tree. A second constraint equation is defined for accommodating those communication paths that cannot be accommodated in the existing tree in one of the candidate tree graphs. A third constraint equation is defined for determining whether each of the candidate tree graphs is used to accommodate at least one of the communication paths. A mathematical programming problem formed by the objective function, and the first, second and third constraint equations is solved to obtain a plurality of trees in which those communication paths that cannot be accommodated in the existing tree can be accommodated.

According to a third aspect of the present invention, a first constraint equation is defined for causing all candidate tree graphs to form a tree and a second constraint equation is defined for accommodating communication paths in one of the candidate tree graphs. Non-negative artificial variables are embedded into the first and second constraint equations. An objective function is defined for minimizing a total number of the non-negative artificial variables. A mathematical programming problem formed by the objective function and the first and second constraint equations is solved to obtain a plurality of trees in which the communication paths can be accommodated.

According to a fourth aspect of the present invention, an existing tree is stored and a decision is made as to whether communication paths can be accommodated in the existing tree. A first constraint equation is defined for accommodating those communication paths which cannot be accommodated in the existing tree in one of the candidate tree graphs. A second constraint equation is defined for causing all of the candidate tree graphs to form a tree. Non-negative artificial variables are embedded into the first and second constraint equations. An objective function is defined for minimizing a total number of the non-negative artificial variables. A mathematical programming problem formed by the objective function, and the first and second constraint equations is solved to obtain a plurality of trees in which those communication paths which cannot be accommodated in the existing tree can be accommodated.

BRIEF DESCRIPTION OF THE DRAWINGS

The present invention will be described in further detail with reference to the accompanying drawings, in which.

DETAILED DESCRIPTION

Figure 1:
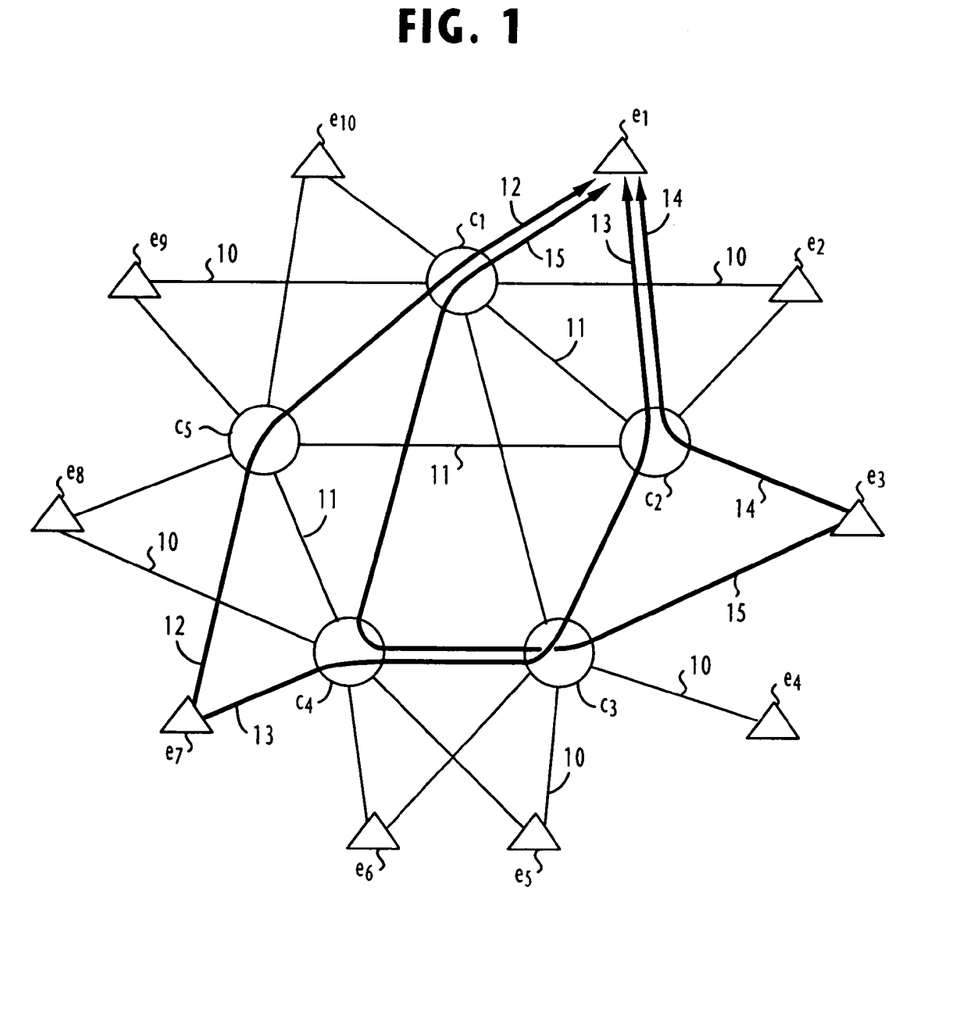
FIG. 1 is a block diagram of a communication network in which a plurality of communication paths are established in the form of a tree as viewed from an egress node.

FIG. 1 represents a fault tolerant communication network in a directed graph for purposes of explanation of the present invention. As illustrated, the network comprises a plurality of edge nodes $e_1 \sim e_{10}$ and a plurality of core (intermediate) nodes $c_1 \sim c_5$. Each edge node is called an ingress node if it receives incoming traffic from end user systems or an egress node if it delivers outgoing traffic to end user systems. Edge nodes $e_1 \sim e_{10}$ are connected to adjacent core nodes as indicated by thin lines 10. Each of the core nodes $c_1 \sim c_5$ is connected to every other core nodes as indicated by a thin line 11.

As opposed to the usual tree graph representation in which the root node is connected by directed arcs (links) to the remaining nodes, the egress node is taken as a root node in the present invention and the links are directed towards the root (egress) node, rather than towards the remaining nodes. A link from one node to any of the other nodes is denoted by an ordered pair of nodes such as ($e_7$, $c_4$).

A communication path from an ingress node to an egress node is represented by an ordered set of nodes such as $e_7$-$c_5$-$c_1$-$e_1$. A set of such communication paths from a number of ingress nodes to the egress node forms a "tree" as viewed from the egress (root) node. For example, if it is desired to establish in the communication network a first path $e_7$-$c_5$-$c_2$-$e_1$, a second path $e_7$-$c_4$-$c_3$-$e_1$, a third path $e_3$-$c_2$-$e_1$ and a fourth path $e_3$-$c_3$-$c_4$-$c_1$-$e_1$, the first, second, third and fourth paths can be accommodated by thick lines 12, 13, 14 and 15, respectively.

Figure 2:
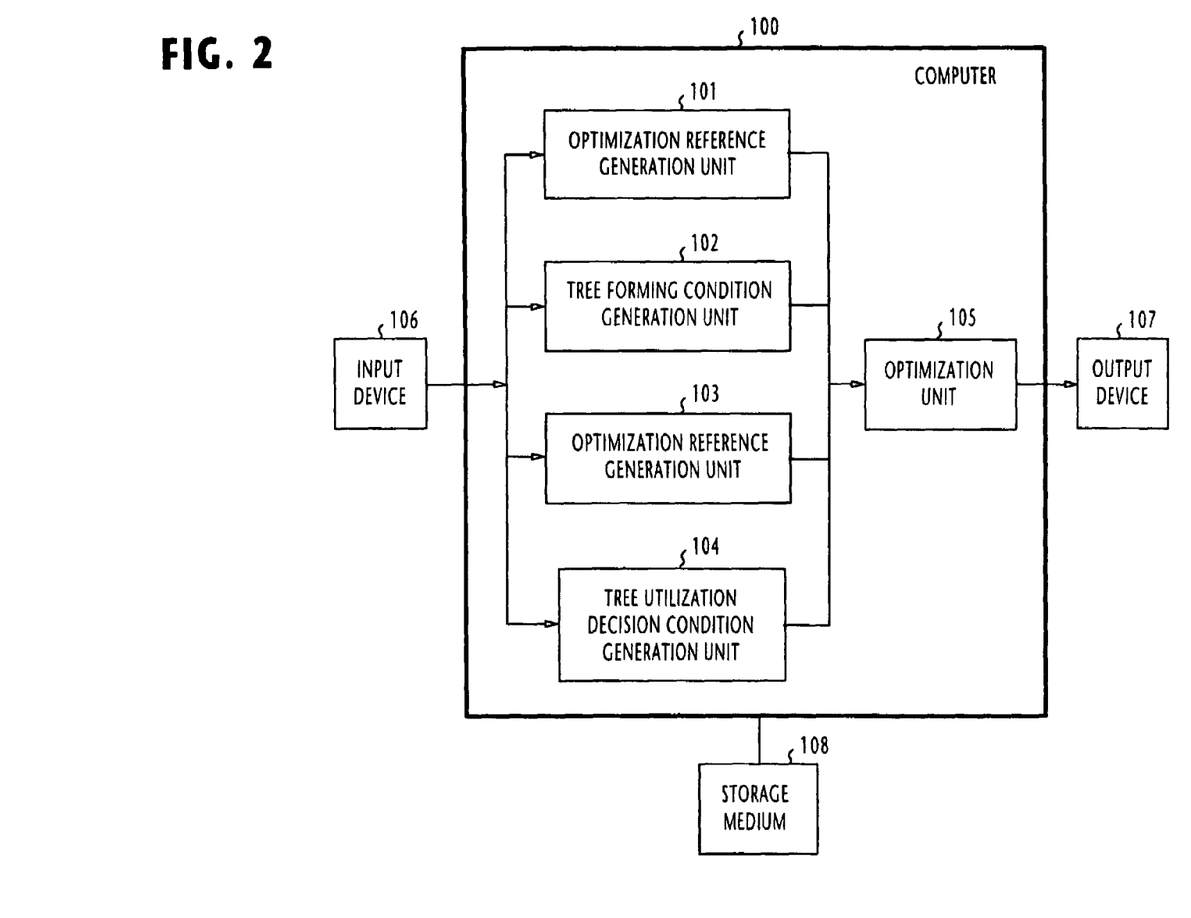
FIG. 2 is a block diagram of an apparatus for designing communication paths within a communication network according to a first embodiment of the present invention.

According to the present invention, an apparatus for designing paths of a tree structure within a communication network is shown in FIG. 2. The design apparatus includes a computer 100, an input device 106 such as a keyboard, an output device 107 such as a display unit, and a storage medium 108 which may be a floppy disk or a read-only memory. Computer 10 includes an optimization reference generation unit 101, a tree forming condition generation unit 102, a path accommodation condition generation unit 103, a tree utilization decision threshold generation unit 104 and an optimization unit 105. A program is stored in the storage medium 108 for instructing the computer 110 to control its internal units to perform their functions according to the flowchart of FIG. 3.

First, the input device 106 is used to enter network topology data representing a communication network. Such topology data includes a plurality of candidate tree graphs. Each of the candidate tree graphs consists of identifiers specifying edge nodes, core nodes and links interconnecting these nodes, identifiers specifying an ingress node and an egress node and a "set" of available paths between the ingress node and the egress node. Additionally, the topology data includes the number of the candidate tree graphs.

Figure 3:
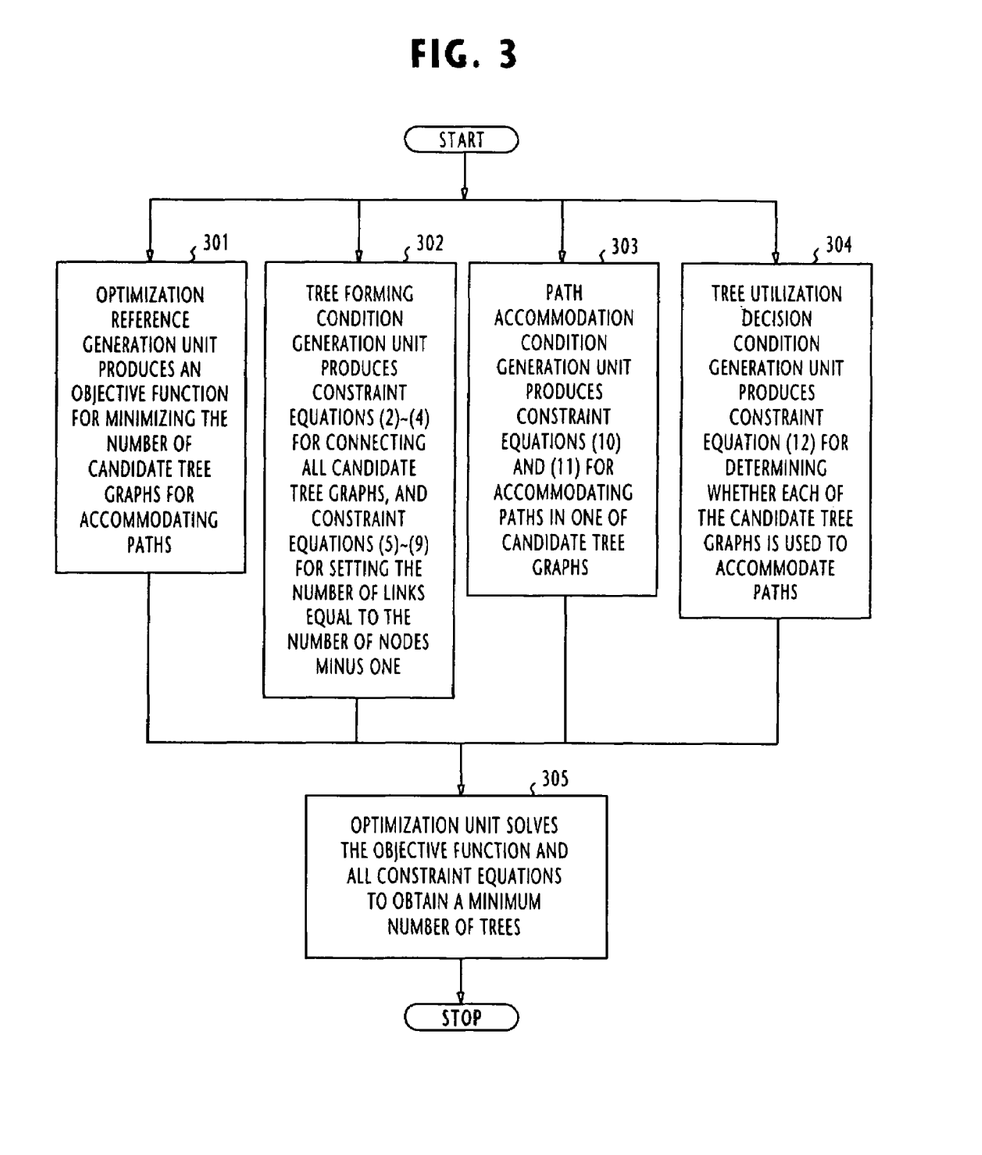
FIG. 3 is a flowchart for operating the design apparatus of FIG. 2.

In response to the input data, the optimization reference generation unit 101 produces an objective function at step 301 (FIG. 3) according to Equation (1) as follows:

Minimize $$\sum_{t_e \in T_e} r^{t_e} \quad (1)$$

where, $t_e$ represents a candidate tree graph at an egress node "e", $T_e$ represents a set of such candidate tree graphs at the egress node "e" and $r^{t_e}$ is a variable which assumes 1 when the candidate tree graph $t_e$ is used to accommodate a path from an ingress node, or 0 otherwise. The objective function of Equation (1) minimizes the number of candidate tree graphs used to accommodate given communication paths.

At step 302, the tree forming condition generation unit 102 defines the following Equations (2), (3) and (4) that constrain candidate tree graphs so that the elements (nodes) of the graphs are connected to form a tree. Equations (2), (3) and (4) are defined by setting the egress node of a network flow problem as a source and the of ingress and core nodes as a sink.

$$\sum_{\{m:(l,m) \in L^{e-c}\}} f^{t_e}_{(l,m)} = 1 \quad (\forall\, t_e \in T_e,\, \forall\, l \in N^{edge} \setminus \{e\}) \quad (2)$$

$$\sum_{\{m:(l,m) \in L^{c-c}\}} f^{t_e}_{(l,m)} - \sum_{\{m:(l,m) \in L^{c-c}\}} f^{t_e}_{(m,l)} + o_{(l,e)} f^{t_e}_{(l,e)} - \sum_{\{m:(m,l) \in L^{e-c}\}} f^{t_e}_{(m,l)} = 1 \quad (3)$$

$(\forall\, t_e \in T_e,\, \forall\, l \in N^{edge} \setminus \{e\})$ $$\sum_{\{m:(l,e) \in L^{e-c}\}} f^{t_e}_{(l,e)} = |N^{edge}| + |N^{core}| - 1 \quad (4)$$

$(\forall\, t_e \in T_e)$ where, $f^{t_e}_{(1,m)}$ represents the amount of traffic carried by a link (1, m) of a candidate tree graph $t_e$, where "1" and "m" are source (upstream) and destination (downstream) nodes of the link, $N^{edge}$ is a set of edge nodes, and $L^{e-c}$ is a set of links that interconnect core nodes and edge nodes. $L^{c-c}$ represents a set of links interconnecting core nodes, $o_{(1,e)}$ is a variable which assumes 1 when a link (1, e) exists between a core node "1" and the egress node "e", or 0 otherwise, and $N^{core}$ represents a set of core nodes.

Equation (2) indicates that the ingress node is a source and Equation (3) indicates that the core nodes are sources, while Equation (4) indicates that the egress node is a sink where it absorbs the traffic $|N^{edge}|+|N^{core}|-1$.

In order to constrain the links so that its number equals the number of nodes minus one, constraint Equation (5) is determined as follows:

$$\sum_{(l,m)\in L^{c-c}} h^{te}_{(l,m)} + \sum_{\{l:(l,e)\in L^{e-c}\}} h^{te}_{(l,e)} + \sum_{l\in N^{edge}\setminus\{e\}} \sum_{\{m:(l,m)\in L^{e-c}\}} h^{te}_{(l,e)} = \quad (5)$$
$$|N^{core}| + |N^{edge}| - 1 \quad (\forall\, t_e \in T_e)$$

where $h^{te}_{(1,m)}$ is a variable that assumes 1 when the candidate tree graph $t_e$ uses a link (1, m), or 0 otherwise. Since the variable used in Equations (2) to (4) is different from the variable used by Equation (5), it is necessary to establish relationships between these different variables. For this reason, the following constraint Equations (6) to (8) are defined:

$$Mh^{te}_{(l,e)} \geq f^{te}_{(l,e)} \quad (\forall\, t_e \in T_e, \forall\, (l, e) \in L^{e-c}) \quad (6)$$

$$Mh^{te}_{(l,m)} \geq f^{te}_{(l,m)} \quad (\forall\, t_e \in T_e, \forall\, (l, m) \in L^{c-c}) \quad (7)$$

$$Mh^{te}_{(l,m)} \geq f^{te}_{(l,m)} \quad (8)$$
$$(\forall\, t_e \in T_e, \forall\, (l, m) \in L^{e-c}, \forall\, l \in N^{edge}\setminus\{e\})$$

where, M is an integer of sufficiently large value. Equation (6) defines the relationships between the variables of the links interconnecting the core nodes and Equation (7) defines the relationships between the variables of the links directed from core nodes to the egress node. Equation (8) defines the relationships between the variables of the links directed from ingress nodes to core nodes.

Note that the fourth terms $f^{te}_{(1,m)}$ and $f^{te}_{(m,1)}$ of Equations (2) and (3) may be replaced with $h^{te}_{(1,m)}$ and $h^{te}_{(m,1)}$, respectively. In this case, Equation (8) is not necessary. Alternatively, Equation (5) can be modified as Equation (9) given below:

$$\sum_{(l,m)\in L^{c-c}} h^{te}_{(l,m)} + \sum_{\{l:(l,e)\in L^{e-c}\}} h^{te}_{(l,e)} = |N^{core}| \quad (\forall\, t_e \in T_e) \quad (9)$$

At step 303, the path accommodation condition generation unit 103 produces Equations (10) and (11) as follows in order to accommodate the given paths into the candidate tree graph:

$$\sum_{(l,m)\in\{L^{P(i,e)}\cap L^{c-c}\}} h^{te}_{(l,m)} + \sum_{(l,m)\in\{L^{P(i,e)}\cap L^{e-c}\}} h^{te}_{(l,m)} \geq |L^{p(i,e)}|\delta^{te}_{P_{(i,e)}} \quad (10)$$
$$(p(i, e) \in P_{(i,e)}, i \in N^{edge}\setminus\{e\}, t_e \in T_e)$$

$$\sum_{t_e\in T_e} \delta^{te}_{P_{(i,e)}} \geq 1 \quad (\forall\, p(i, e) \in P_{(i,e)}, \forall\, i \in N\{e\}) \quad (11)$$

where, $p_{(i,e)}$ is the element of a set of links $P_{(i,e)}$ between an ingress node "i" and an egress node "e" and $\delta^{te}_{p(i,e)}$ is a variable that assumes 1 when the candidate tree graph $t_e$ includes the path $p_{(i,e)}$, or 0 otherwise. In Equation (10) the variables $h^{te}_{(1,m)}$ associated with links used by paths $p_{(i,e)}$ are summed. If the sum is equal to the number of hops of the path $p_{(i,e)}$ Equation (10) indicates that the path $p_{(i,e)}$ is accommodated in the candidate tree graph $t_e$.

At step 304, the tree utilization decision threshold generation unit 104 produces Equation (12) that determines whether a candidate tree graph is used for accommodating the path.

$$\sum_{i\in N^{edge}\setminus\{e\}} \sum_{p(i,e)\in P_{(i,e)}} \delta^{te}_{P_{(i,e)}} \leq Mr^{te} \quad (\forall\, t_e \in T_e) \quad (12)$$

According to Equation (12), the variable $r^{te}$ is set equal to 1 even if there is only one candidate tree graph $t_e$ that accommodates a path.

Finally, at step 305, the optimization unit 105 uses a simplex method to solve the mathematical programming problem formed by objective function (1) and constraint Equations (2) to (12) defined by the units 101, 102, 103 and 104 to obtain a minimum number of trees. If it is desired to design a path from the ingress node to more than one egress node, the process of FIG. 3 may be repeated for each of the egress nodes.

Figure 4:
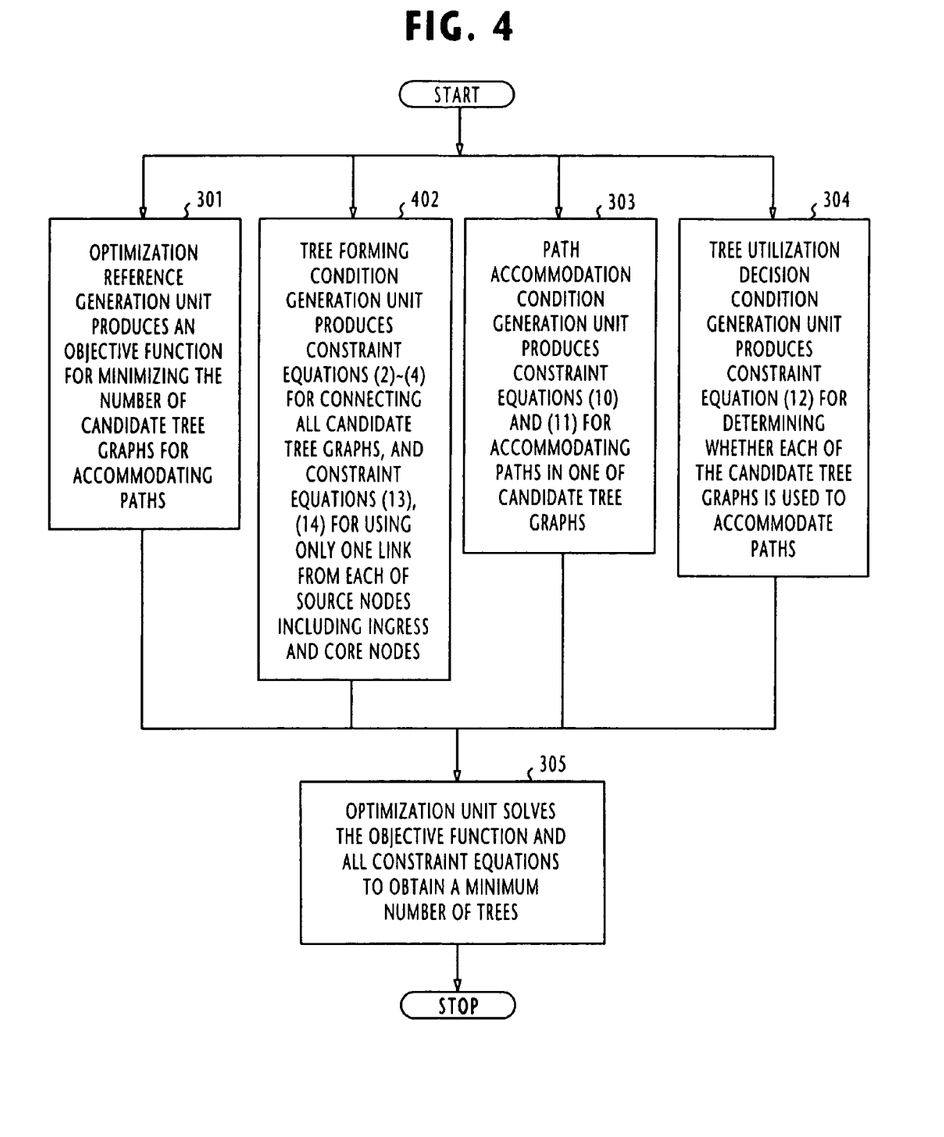
FIG. 4 is a modified flowchart of FIG. 3.

The design algorithm of FIG. 3 may be modified as shown in FIG. 4 which differs from the previous embodiment in that the tree forming condition generation unit 102 performs step 402 instead of step 302 of FIG. 3.

At step 402, the tree forming condition generation unit 102 produces Equations (2) to (4) as described above and then Equations (13) and (14) for using only one of the links that emanate from source nodes which include the ingress node and all core nodes.

$$\sum_{\{m:(l,m)\in L^{c-c}\}} h^{te}_{(l,m)} + o_{(l,e)}h^{te}_{(l,e)} = 1 \quad (\forall\, l \in N^{core}, \forall\, t_e \in T_e) \quad (14)$$

$$\sum_{\{m:(l,m)\in L^{c-c}\}} h^{te}_{(l,m)} = 1 \quad (\forall\, l \in N^{edge}\setminus\{e\}, \forall\, t_e \in T_e) \quad (13)$$

Equation (13) is used for constraining the links that emanate from the ingress node to one link, and Equation (14) is used for constraining the links that emanate from all core nodes to one link. Equation (3) may be altered as Equation (15) as follows if the core nodes are not treated as sources.

Figure 5:
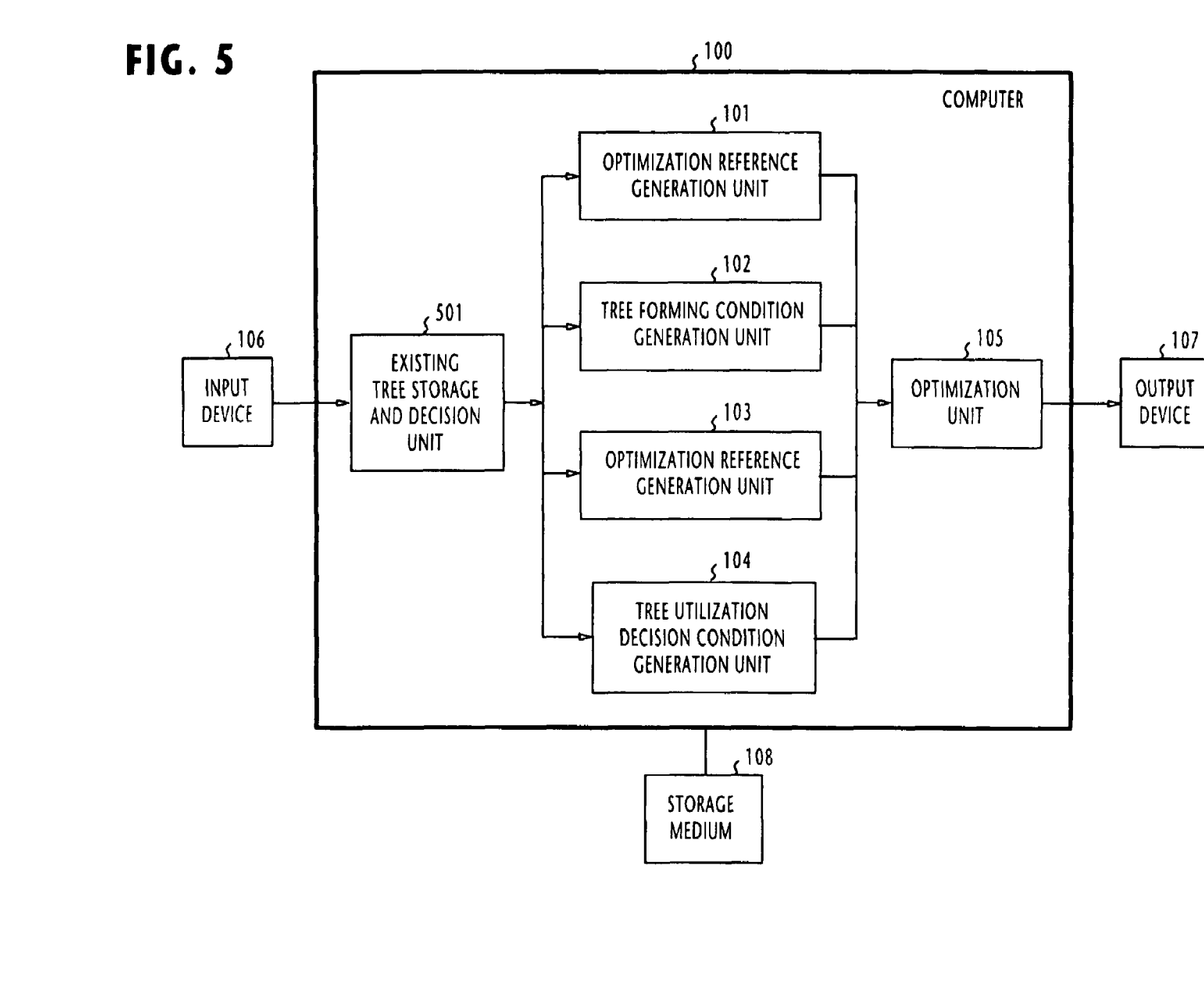
FIG. 5 is a block diagram of a design apparatus of the present invention according to a second embodiment.

Apparatus of FIG. 2 may be modified as shown in FIG. 5 by additionally including an existing tree memory 501 for storing a set of existing trees entered through the input device 106.

Figure 6:
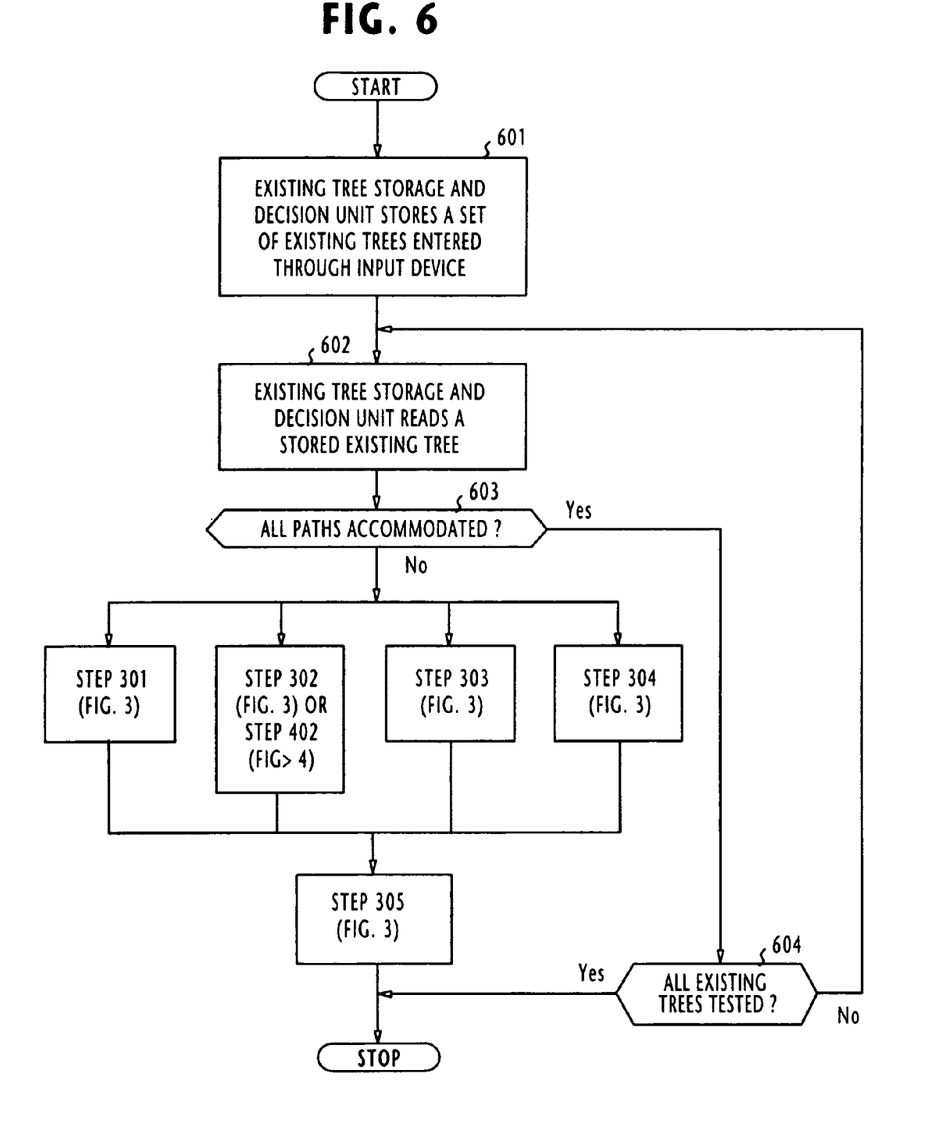
FIG. 6 is a flowchart for operating the design apparatus of FIG. 5.

The flowchart of FIG. 3 may be further modified as shown in FIG. 6 to control the computer 100 of FIG. 5. In this modification, the existing trees from the input device 106 are stored in the memory 501 at step 601. At step 602, the CPU of computer 100 reads a stored existing tree $t_e$ from the memory and determines whether a desired path $p_{(i,\,e)}$ can be accommodated in the read existing tree $t_e$ (step 603) by using the following decision Equation (16) given below.

$$\sum_{(l,m) \in \{L^{P(i,e)} \cap L^{e-c}\}} j^{te}_{(l,m)} + \sum_{\{(l,m) \in \{L^{P(i,e)} \cap L^{e-c}\}\}} j^{te}_{(l,m)} = |L^{P(i,e)}| \quad (16)$$

where, $j^{te}_{(l,m)}$ is a variable which assumes 1 if the existing tree $t_e$ is using the link (1,m) or 0 otherwise. If all the given communication paths can be accommodated in the read existing tree, the decision is affirmative at step 603 and flow proceeds to step 604 to check to see if all existing trees are tested. If so, the computer proceeds to the end of the routine. Otherwise, flow returns from step 604 to step 602 to read out the next existing tree from the memory. If the decision at step 603 is negative, steps 301, 302 (or 402), 303, 304 and 305 are performed in the same manner as described above on the communication paths which cannot be accommodated in the read existing tree.

Figure 7:
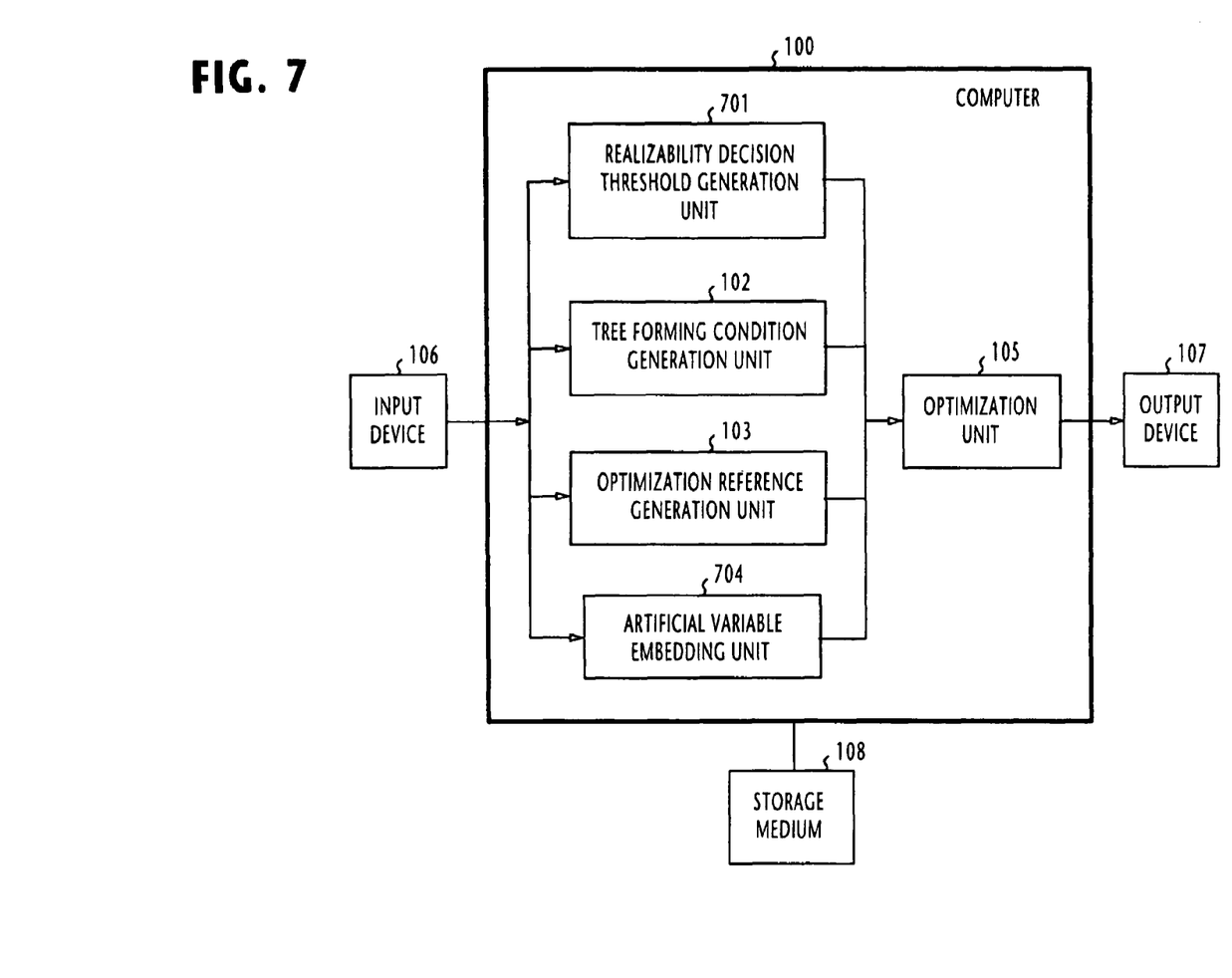
FIG. 7 is a block diagram of a design apparatus according to a third embodiment of the present invention.

FIG. 7 is a block diagram of a further modification of the present invention in which the optimization reference generation unit 101 of the previous embodiments is replaced with a realizability decision threshold generation unit 701 and the tree utilization decision condition generation unit 104 is replaced with an artificial variable embedding unit 704.

Figure 8:
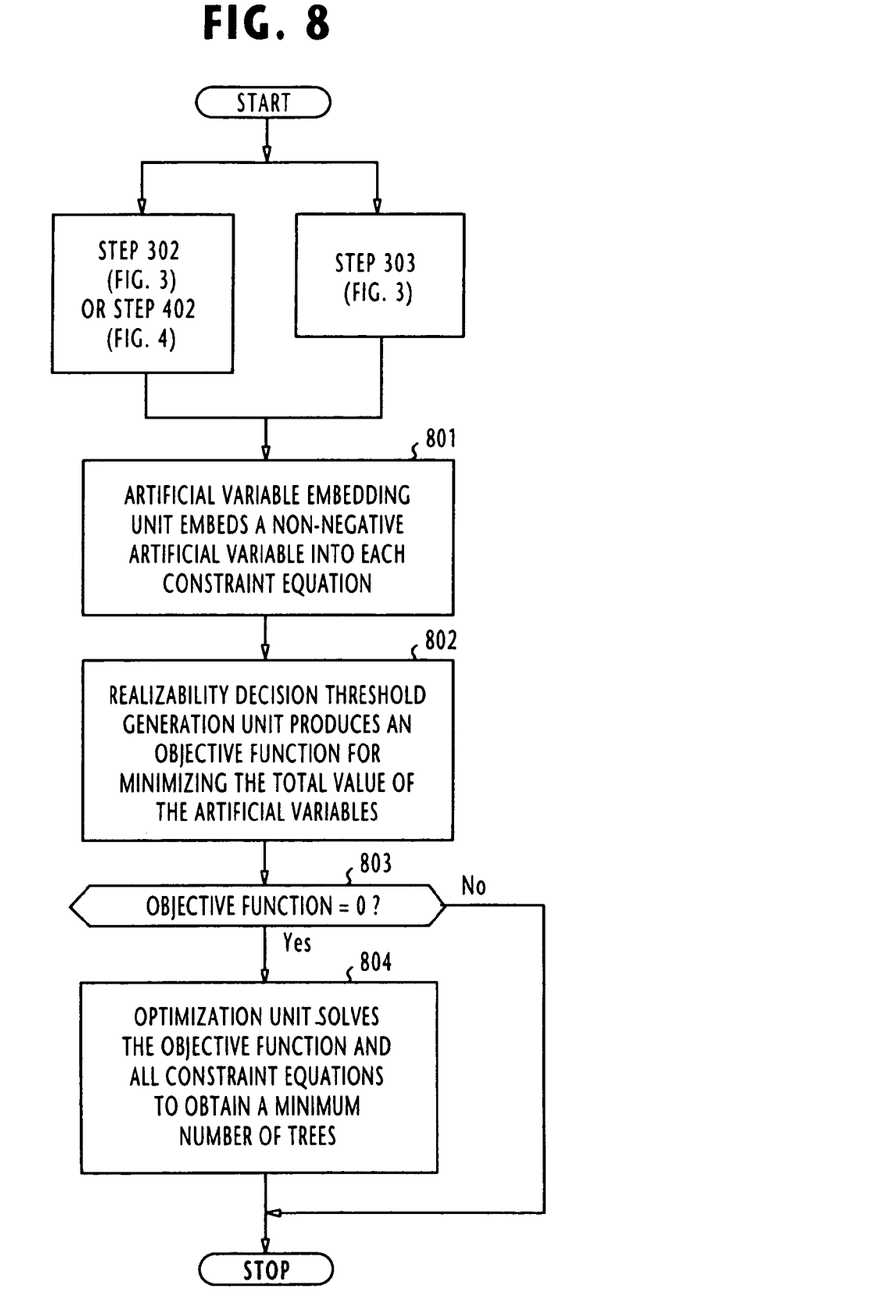
FIG. 8 is a flowchart for operating the design apparatus of FIG. 7.

FIG. 8 is a flowchart for operating the design apparatus of FIG. 7. The computer initially instructs the tree forming condition generation unit 102 to perform steps 302 (or 402) of the previous embodiments and then instructs the optimization reference generation unit 103 to perform step 303 to produce constraint Equations (2) to (12). At step 801, the artificial variable embedding unit 704 embeds an artificial variable into each of the constraint Equations by setting coefficient matrix A, variable vector x, coefficient vector c. If artificial variable vector is denoted as "y" and the artificial variable of the k-th constraint Equation is denoted as "$y_k$", the k-th Equation would be represented as follows:

$$a_k x + y_k = c_k \quad (17)$$

At step 802, the realizability decision threshold generation unit 701 produces an objective function that minimizes the total value of the embedded artificial variables. At step 803, the optimization unit 105 solves the objective function. If the objective function is zero (step 803), the optimization unit proceeds to solve the mathematical programming problem of the constraint Equations to obtain a minimum number of trees (step 804).

Figure 9:
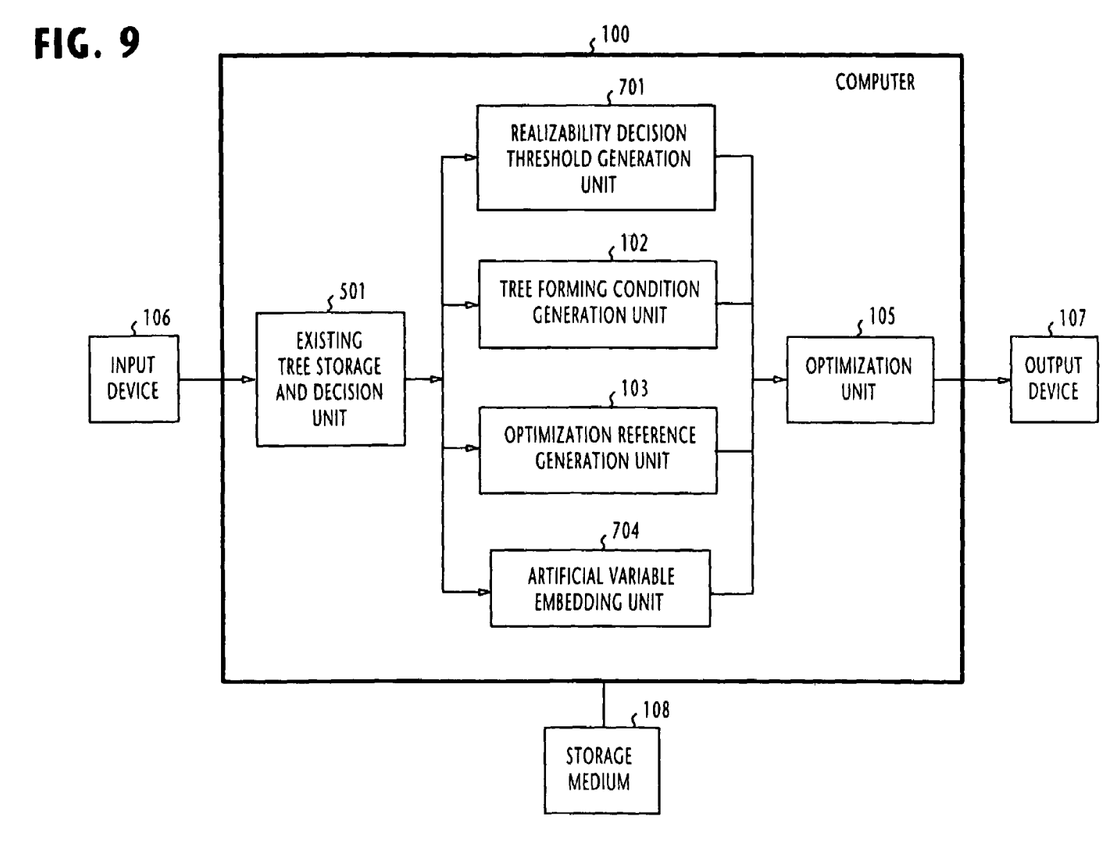
FIG. 9 is a block diagram of a design apparatus according to a fourth embodiment of the present invention.
Figure 10:
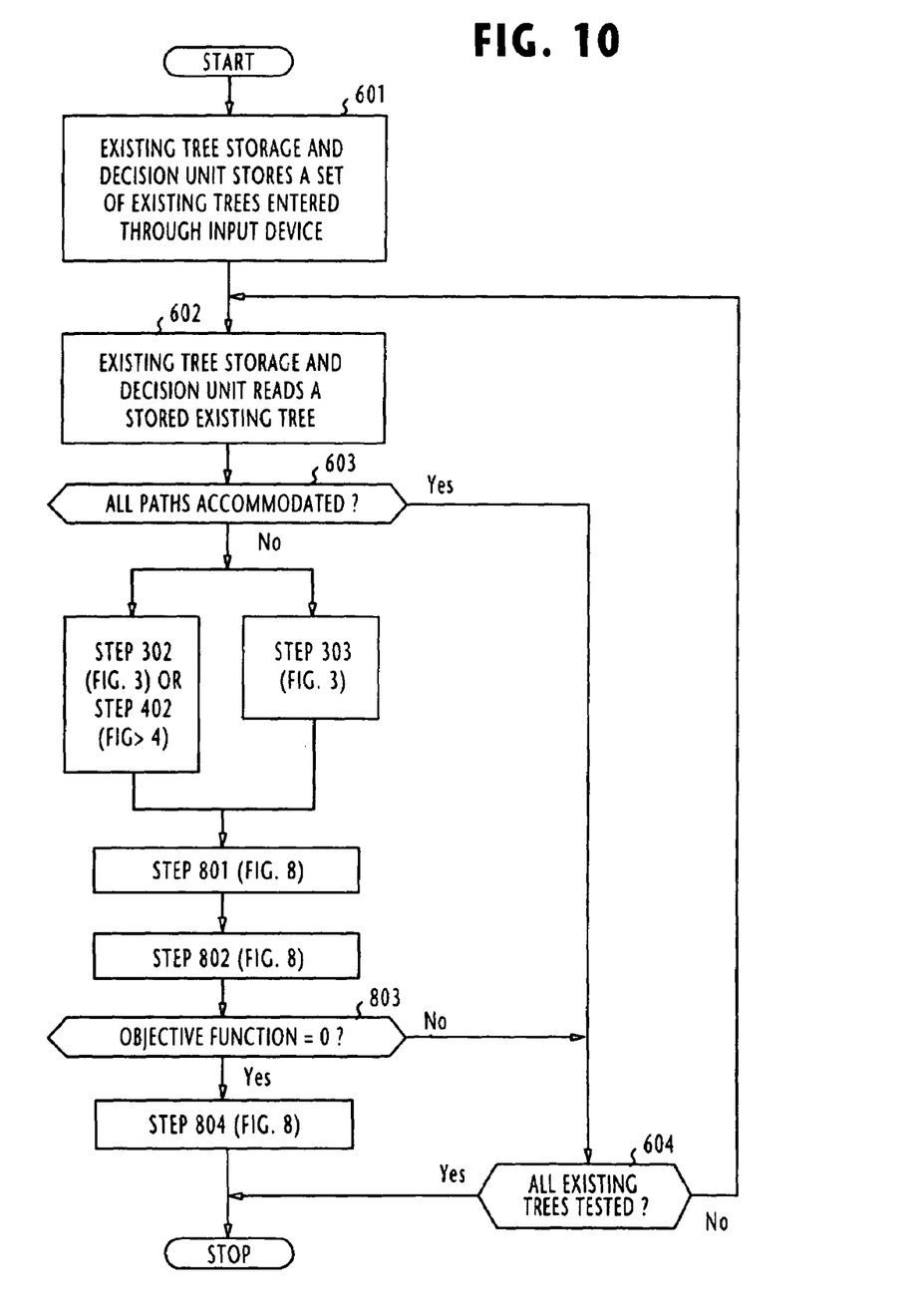
FIG. 10 is a flowchart for operating the design apparatus of FIG. 9.

The previous embodiments of FIGS. 5 and 7 can be combined as shown in FIG. 9 such that the existing tree storage and decision unit 501 is associated with the units 701, 102, 103 and 704. The operation of the apparatus of FIG. 9 proceeds according to the flowchart of FIG. 10 which combines the flowcharts of FIGS. 6 and 8. In FIG. 10, step 803 branches out to step 604 if the objective function is not equal to zero in order to repeat the testing on the next existing tree stored in the memory if all existing trees still have not been tested.

What is claimed is:

1. In a communication network comprising an ingress node, a plurality of core nodes connected by links to the ingress node, and an egress node connected by links to the ingress node via the core nodes, said ingress node receiving communication traffic of the network and said egress node delivering communication traffic of the network, an apparatus for designing a plurality of communication paths between said ingress node and said egress node, the apparatus comprising:

means for defining an objective function for minimizing a number of candidate tree graphs for accommodating said communication paths;

means for defining a first constraint equation for causing all of said candidate tree graphs to form a tree;

means for defining a second constraint equation for accommodating said communication paths in one of said candidate tree graphs;

means for defining a third constraint equation for determining whether each of said candidate tree graphs is used to accommodate said communication paths; and means for solving a mathematical programming problem formed by said objective function, and said first, second and third constraint equations to obtain a plurality of trees in which said communication paths can be accommodated.

2. In a communication network comprising an ingress node, a plurality of core nodes connected by links to the ingress node, and an egress node connected by links to the ingress node via the core nodes, said ingress node receiving communication traffic of the network and said egress node delivering communication traffic of the network, an apparatus for designing a plurality of communication paths between said ingress node and said egress node, the apparatus comprising:

means for storing an existing tree and determining whether said communication paths can be accommodated in said existing tree;

means for defining an objective function for minimizing a number of candidate tree graphs for accommodating ones of said communication paths which cannot be accommodated in said existing tree;

means for defining a first constraint equation for causing all of said candidate tree graphs to form a tree if all of said communication paths cannot be accommodated in said existing tree;

means for defining a second constraint equation for accommodating said ones of communication paths in one of said candidate tree graphs;

means for defining a third constraint equation for determining whether each of said candidate tree graphs is used to accommodate at least one of said communication paths; and means for solving a mathematical programming problem formed by said objective function, and said first, second and third constraint equations to obtain a plurality of trees in which said ones of communication paths can be accommodated.

3. In a communication network comprising an ingress node, a plurality of core nodes connected by links to the ingress node, and an egress node connected by links to the ingress node via the core nodes, said ingress node receiving communication traffic of the network and said egress node delivering communication traffic of the network, an apparatus for designing a plurality of communication paths between said ingress node and said egress node, the apparatus comprising:

means for defining a first constraint equation for causing all candidate tree graphs to form a tree;

means for defining a second constraint equation for accommodating said communication paths in one of said candidate tree graphs;

means for embedding non-negative artificial variables into said first and second constraint equations;

means for defining an objective function for minimizing a total number of said non-negative artificial variables; and means for solving a mathematical programming problem formed by said objective function, and said first and second constraint equations to obtain a plurality of trees in which said communication paths can be accommodated.

4. In a communication network comprising an ingress node, a plurality of core nodes connected by links to the ingress node, and an egress node connected by links to the ingress node via the core nodes, said ingress node receiving communication traffic of the network and said egress node delivering communication traffic of the network, an apparatus for designing a plurality of communication paths between said ingress node and said egress node, the apparatus comprising:

means for storing an existing tree and determining whether said communication paths can be accommodated in said existing tree;

means for defining a first constraint equation for accommodating ones of said communication paths which cannot be accommodated in said existing tree in one of said candidate tree graphs;

means for defining a second constraint equation for causing all of said candidate tree graphs to form a tree;

means for embedding non-negative artificial variables into said first and second constraint equations;

means for defining an objective function for minimizing a total number of said non-negative artificial variables; and means for solving a mathematical programming problem formed by said objective function, and said first and second constraint equations to obtain a plurality of trees in which said ones of communication paths can be accommodated.

5. In a communication network comprising an ingress node, a plurality of core nodes connected by links to the ingress node, and an egress node connected by links to the ingress node via the core nodes, said ingress node receiving communication traffic of the network and said egress node delivering communication traffic of the network, a method of designing a plurality of communication paths between said ingress node and said egress node, the method comprising:

defining an objective function for minimizing a number of candidate tree graphs for accommodating said communication paths;

defining a first constraint equation for causing all of said candidate tree graphs to form a tree;

defining a second constraint equation for accommodating said communication paths in one of said candidate tree graphs;

defining a third constraint equation for determining whether each of said candidate tree graphs is used to accommodate said communication paths; and solving a mathematical programming problem formed by said objective function, and said first, second and third constraint equations to obtain a plurality of trees in which said communication paths can be accommodated.

6. In a communication network comprising an ingress node, a plurality of core nodes connected by links to the ingress node, and an egress node connected by links to the ingress node via the core nodes, said ingress node receiving communication traffic of the network and said egress node delivering communication traffic of the network, a method of designing a plurality of communication paths between said ingress node and said egress node, the method comprising:

storing an existing tree and determining whether said communication paths can be accommodated in said existing tree;

defining an objective function for minimizing a number of candidate tree graphs for accommodating ones of said communication paths which cannot be accommodated in said existing tree;

defining a first constraint equation for causing all of said candidate tree graphs to form a tree if all of said communication paths cannot be accommodated in said existing tree;

defining a second constraint equation for accommodating said ones of communication paths in one of said candidate tree graphs;

defining a third constraint equation for determining whether each of said candidate tree graphs is used to accommodate at least one of said communication paths; and solving a mathematical programming problem formed by said objective function, and said first, second and third constraint equations to obtain a plurality of trees in which said ones of said communication paths can be accommodated.

7. In a communication network comprising an ingress node, a plurality of core nodes connected by links to the ingress node, and an egress node connected by links to the ingress node via the core nodes, said ingress node receiving communication traffic of the network and said egress node delivering communication traffic of the network, a method of designing a plurality of communication paths between said ingress node and said egress node, the method comprising:

defining a first constraint equation for causing all candidate tree graphs to form a tree;

defining a second constraint equation for accommodating said communication paths in one of said candidate tree graphs;

embedding non-negative artificial variables into said first and second constraint equations;

defining an objective function for minimizing a total number of said non-negative artificial variables; and solving a mathematical programming problem formed by said objective function, and said first and second constraint equations to obtain a plurality of trees in which said communication paths can be accommodated.

8. In a communication network comprising an ingress node, a plurality of core nodes connected by links to the ingress node, and an egress node connected by links to the ingress node via the core nodes, said ingress node receiving communication traffic of the network and said egress node delivering communication traffic of the network, a method of designing a plurality of communication paths between said ingress node and said egress node, the method comprising:

storing an existing tree and determining whether said communication paths can be accommodated in said existing tree;

defining a first constraint equation for accommodating ones of said communication paths which cannot be accommodated in said existing tree in one of said candidate tree graphs;

defining a second constraint equation for causing all of said candidate tree graphs to form a tree;

embedding non-negative artificial variables into said first and second constraint equations;

defining an objective function for minimizing a total number of said non-negative artificial variables; and solving a mathematical programming problem formed by said objective function, and said first and second constraint equations to obtain a plurality of trees in which said ones of communication paths can be accommodated.

9. In a communication network comprising an ingress node, a plurality of core nodes connected by links to the ingress node, and an egress node connected by links to the ingress node via the core nodes, said ingress node receiving communication traffic of the network and said egress node delivering communication traffic of the network, a storage medium for storing an algorithm for operating a computer to design a plurality of communication paths between said ingress node and said egress node, said algorithm comprising:

defining an objective function for minimizing a number of candidate tree graphs for accommodating said communication paths;

defining a first constraint equation for causing all of said candidate tree graphs to form a tree;

defining a second constraint equation for accommodating said communication paths in one of said candidate tree graphs;

defining a third constraint equation for determining whether each of said candidate tree graphs is used to accommodate said communication paths; and solving a mathematical programming problem formed by said objective function, and said first, second and third constraint constrain equations to obtain a plurality of trees in which said communication paths can be accommodated.

10. In a communication network comprising an ingress node, a plurality of core nodes connected by links to the ingress node, and an egress node connected by links to the ingress node via the core nodes, said ingress node receiving communication traffic of the network and said egress node delivering communication traffic of the network, a storage medium for storing an algorithm for operating a computer to design a plurality of communication paths between said ingress node and said egress node, said algorithm comprising:

storing an existing tree and determining whether said communication paths can be accommodated in said existing tree;

defining an objective function for minimizing a number of candidate tree graphs for accommodating ones of said communication paths which cannot be accommodated in said existing tree;

defining a first constraint equation for causing all of said candidate tree graphs to form a tree if all of said communication paths cannot be accommodated in said existing tree;

defining a second constraint equation for accommodating said ones of communication paths in one of said candidate tree graphs;

defining a third constraint equation for determining whether each of said candidate tree graphs is used to accommodate at least one of said communication paths; and solving a mathematical programming problem formed by said objective function, and said first, second and third constraint equations to obtain a plurality of trees in which said communication paths can be accommodated.

11. In a communication network comprising an ingress node, a plurality of core nodes connected by links to the ingress node, and an egress node connected by links to the ingress node via the core nodes, said ingress node receiving communication traffic of the network and said egress node delivering communication traffic of the network, a storage medium for storing an algorithm for operating a computer to design a plurality of communication paths between said ingress node and said egress node, said algorithm comprising:

defining a first constraint equation for causing all candidate tree graphs to form a tree;

defining a second constraint equation for accommodating said communication paths in one of said candidate tree graphs;

embedding non-negative artificial variables into said first and second constraint equations;

defining an objective function for minimizing a total number of said non-negative artificial variables; and solving a mathematical programming problem formed by said objective function, and said first and second constraint equations to obtain a plurality of trees in which said ones of said communication paths can be accommodated.

12. In a communication network comprising an ingress node, a plurality of core nodes connected by links to the ingress node, and an egress node connected by links to the ingress node via the core nodes, said ingress node receiving communication traffic of the network and said egress node delivering communication traffic of the network, a storage medium for storing an algorithm for operating a computer to design a plurality of communication paths between said ingress node and said egress node, said algorithm comprising:

storing an existing tree and determining whether said communication paths can be accommodated in said existing tree;

defining a first constraint equation for accommodating ones of said communication paths which cannot be accommodated in said existing tree in one of said candidate tree graphs;

defining a second constraint equation for causing all of said candidate tree graphs to form a tree;

embedding non-negative artificial variables into said first and second constraint equations;

defining an objective function for minimizing a total number of said non-negative artificial variables; and solving a mathematical programming problem formed by said objective function, and said first and second constraint equations to obtain a plurality of trees in which said ones of communication paths can be accommodated.

* * * * *